United States Patent
Smith

(10) Patent No.: US 7,117,287 B2
(45) Date of Patent: Oct. 3, 2006

(54) HISTORY FIFO WITH BYPASS WHEREIN AN ORDER THROUGH QUEUE IS MAINTAINED IRRESPECTIVE OF RETRIEVAL OF DATA

(75) Inventor: Brian Smith, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 220 days.

(21) Appl. No.: 10/449,926

(22) Filed: May 30, 2003

(65) Prior Publication Data

US 2004/0243743 A1 Dec. 2, 2004

(51) Int. Cl.
*G06F 13/36* (2006.01)
*G06F 12/00* (2006.01)

(52) U.S. Cl. .......................... 710/310; 710/52; 710/53; 710/54; 710/57; 710/306; 710/309; 710/317

(58) Field of Classification Search ............... 710/52, 710/53, 54, 57, 310, 317, 306
See application file for complete search history.

(56) References Cited

U.S. PATENT DOCUMENTS

| | | | | |
|---|---|---|---|---|
| 5,699,530 A | * | 12/1997 | Rust et al. | 711/150 |
| 5,796,413 A | * | 8/1998 | Shipp et al. | 345/522 |
| 6,092,128 A | * | 7/2000 | Maas et al. | 710/57 |
| 6,487,627 B1 | * | 11/2002 | Willke et al. | 710/306 |
| 6,614,798 B1 | | 9/2003 | Bishop et al. | |
| 6,801,976 B1 | * | 10/2004 | Creta et al. | 710/310 |
| 6,804,750 B1 | * | 10/2004 | LaBerge | 711/154 |
| 6,912,612 B1 | * | 6/2005 | Kapur et al. | 710/309 |
| 2004/0022094 A1 | * | 2/2004 | Radhakrishnan et al. | 365/200 |
| 2004/0064626 A1 | * | 4/2004 | Shah et al. | 710/310 |
| 2004/0107240 A1 | * | 6/2004 | Zabarski et al. | 709/201 |

OTHER PUBLICATIONS http://wombat.doc.ic.ac.uk/foldoc/, definition of "Circular Buffer", Jun. 17, 2000.*
Rajpal, et al; "Operating FIFOs On Full and Empty Boundary Conditions"; Integrated Device Technology, Inc.; Mar. 1999.
"Bus Matching with IDT FIFOs"; Integrated Device Technology; Apr. 2001.
"CMOS Asynchronous FIFO 256×9, 512×9 and 1,024×9"; Integrated Device Technology, Inc.; Sep. 2002.

* cited by examiner

*Primary Examiner*—Tammara Peyton
(74) *Attorney, Agent, or Firm*—Myertons Hood Kivlin Kowert & Goetzel, P.C.; B. Noël Kivlin

(57) ABSTRACT

An apparatus and method for maintaining a circular FIFO (first-in, first-out) queue in an I/O (input-output) subsystem of a computer system such as a server, workstation, or storage machine. The queue is coupled to a bypass circuit, used to provide access to data items out of the order in which they were stored in the queue, thus bypassing the latency inherent in retrieving the items from the queue. Control logic maintains write and read pointers indicating locations in the queue for writing and reading data items. The write pointer is incremented upon every data event to the queue, thereby maintaining a history of data that has been written to the queue, which is useful for diagnostic purposes. A history flag is maintained to indicate whether the write pointer has wrapped around the addresses in the queue, indicating whether all data items in the queue are valid for diagnostic purposes.

12 Claims, 7 Drawing Sheets

Figure 4

| | | Cycle 1 | Cycle 2 | Cycle 3 | Cycle 4 | (Etc.) |
|---|---|---|---|---|---|---|
| FIFO: | Input Register | Data 1 | Data 2 | Data 3 | Data 4 | |
| | SRAM Array | | Data 1 | Data 2 | Data 3 | |
| | Output Register | | | (Data 1) | Data 2 | |
| | MUX | | | | (Data 1) | |
| Bypass: | Stage 1 | Data 1 | Data 2 | Data 3 | Data 4 | |
| | Stage 2 | | | Data 2 | Data 3 | |
| | MUX | | Data 1 | | | |
| | (Discarded) | | | | Data 2 | |

Figure 6

|  | Cycle1 | Cycle2 | Cycle3 | Cycle4 | Cycle5 | Cycle6 | Cycle7 | Cycle8 | Cycle9 | Cycle10 | Cycle11 |
|---|---|---|---|---|---|---|---|---|---|---|---|
| FIFO: | | | | | | | | | | | |
| Input Reg | Data1 | Data2 | Data3 | Data4 | Data5 | Data6 | Data7 | Data8 | Data9 | Data10 | Data11 |
| SRAM Array | X | Data1 | Data2 | Data3 | Data4 | Data5 | Data6 | Data7 | Data8 | Data9 | Data10 |
| Output Reg | X | X | Data1 | Data2 | Data3 | Data4 | Data4 | Data5 | Data6 | Data7 | Data8 |
| WritePtr | 1 | 2 | 3 | 4 | 5 | 6 | 7 | 8 | 9 | 10 | 11 |
| ReadPtr | X | 1 | 2 | 3 | 4 | 4 | 5 | 6 | 7 | 8 | 8 |
| Bypass: | | | | | | | | | | | |
| Stage1 | X | Data2 | Data3 | Data3 | Data3 | Data3 | Data4 | X | X | X | Data7 |
| Stage2 | Data1 | Data1 | Data2 | Data2 | Data2 | Data2 | Data3 | Data4 | Data5 | Data6 | Data6 |
| Mux | X | Data1 | Data1 | Data2 | Data2 | Data2 | Data2 | Data3 | Data4 | Data5 | Data6 |
| Discarded | | | Data1 | | | | Data2 | Data3 | Data4 | Data5 | |
| Pop | | 1 | | | | 1 | 1 | 1 | 1 | | |
| Push | 1 | 1 | 1 | 1 | 1 | 1 | 1 | 1 | 1 | 1 | 1 |

Figure 7
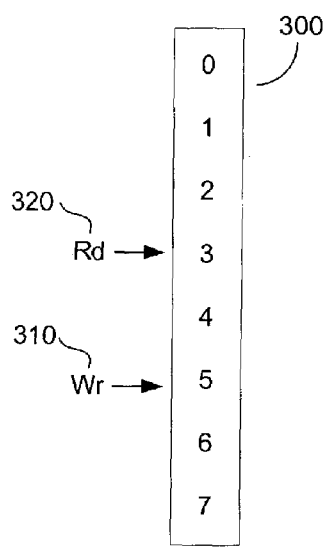
Figure 8
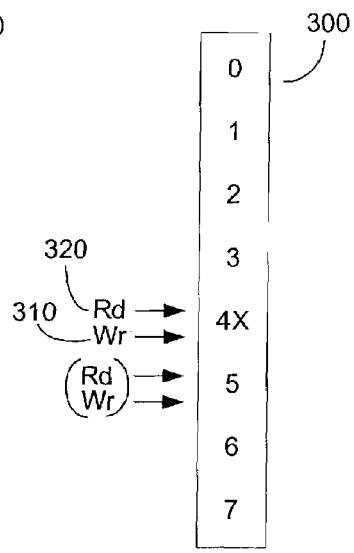
Figure 9
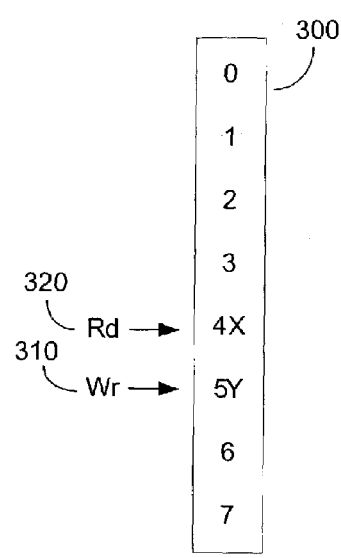
Figure 10
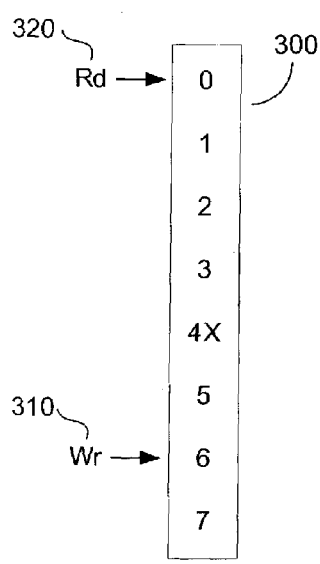
Figure 11
| Bypass Stage | Cycle 1 | Cycle 2 |
|---|---|---|
| 1 | 4 | 5 |
| 2 | 3 | 4 |
| 3 | 2 | 3 |
| 4 | 1 | 2 |
| 5 | 0 | 1 |
FIFO Levels

HISTORY FIFO WITH BYPASS WHEREIN AN ORDER THROUGH QUEUE IS MAINTAINED IRRESPECTIVE OF RETRIEVAL OF DATA

BACKGROUND OF THE INVENTION

The present invention relates to processor-based systems, such as servers and workstations, with I/O (input-output) subsystems or other components or circuits that maintain a FIFO of read and write data.

When an error occurs in a computer system, a useful diagnostic tool is a record of the data transactions that have occurred, in particular the specific read and write data that the I/O subsystem has been transmitting to devices either internal or external to the system. Thus, a history of the inputs to, e.g., a chip or circuit is useful to maintain.

Typically, an I/O subsystem will use a FIFO (first-in, first-out) queue to store read and write data. A particular configuration of FIFO is a circular FIFO, in which all inputs are stored until they are overwritten by subsequent inputs. The present invention will be described in connection with a FIFO in an I/O circuit, but in general the FIFO may be anywhere in the system that queuing of data is required.

Retrieving data from a FIFO involves an inherent latency, and thus the use of a bypass path may be helpful to minimize this latency, by allowing faster access to requested data than if the data is retrieved from the FIFO queue.

A problem with the use of a bypass path is that in conventional systems, inputs provided to a chip or circuit through the bypass path do not become part of the history of transactions that otherwise might occur by passing through the FIFO queue. Accordingly, there has been a trade-off between the ability to speed up data transactions by using a bypass and the ability to debug errors in a system by inspecting suspect transactions.

Accordingly, a system is needed that allows both the lower latency of data access provided by the use of a bypass path, and the advantages of a FIFO that can store the history of data reads and writes in the system.

SUMMARY OF THE INVENTION

An apparatus according to the invention includes control logic—i.e. hardware, software and/or firmware—that controls the operations of a circular FIFO queue in an I/O subsystem of a processor-based system. A bypass circuit is coupled to the FIFO queue and provides access to items that have been written to the queue, in the order in which they had been written, but bypassing the latency that is usual in a FIFO queue. The control logic operates to maintain a write pointer and a read pointer, which indicate locations in the FIFO queue for data items that are to be written to and read from the queue, respectively.

The control logic is configured to increment the data write pointer upon each data write event to the queue, even when the written data item is immediately accessed by a data read event, thus maintaining a history of all data write events to the queue, even while maintaining the empty state of the queue—i.e. maintaining a state where all data that has been written into the queue has been read out. Diagnostic or debugging software can then be used to inspect the data in the queue locations, even though that data may for normal system purposes be invalid.

When the queue is full, the write pointer wraps around again to the beginning locations of the queue. A history flag is maintained to indicate that the write pointer has wrapped around, thus providing an indication to the diagnostic software of whether all of the data items in the queue are useful for diagnostic purposes. Before the FIFO's write pointer has wrapped, data between the write pointer forward (in the wrap direction) to the read pointer is invalid for history analysis. Once the FIFO's write pointer has wrapped once, the data entries are all valid for history analysis, regardless of how many subsequent wraps there may have been.

BRIEF DESCRIPTION OF THE DRAWINGS

FIG. 4 is a timing diagram illustrating operation of the subsystem of FIG. 3.

FIG. 6 is a timing diagram illustrating operation of the subsystem of FIG. 5.

FIGS. 7–10 are block diagrams indicating read and write pointer positioning in accordance with an embodiment of the invention.

FIG. 11 is a block diagram illustrating data handling for two cycles in a system according to the invention.

DETAILED DESCRIPTION OF THE INVENTION

Figure 1:
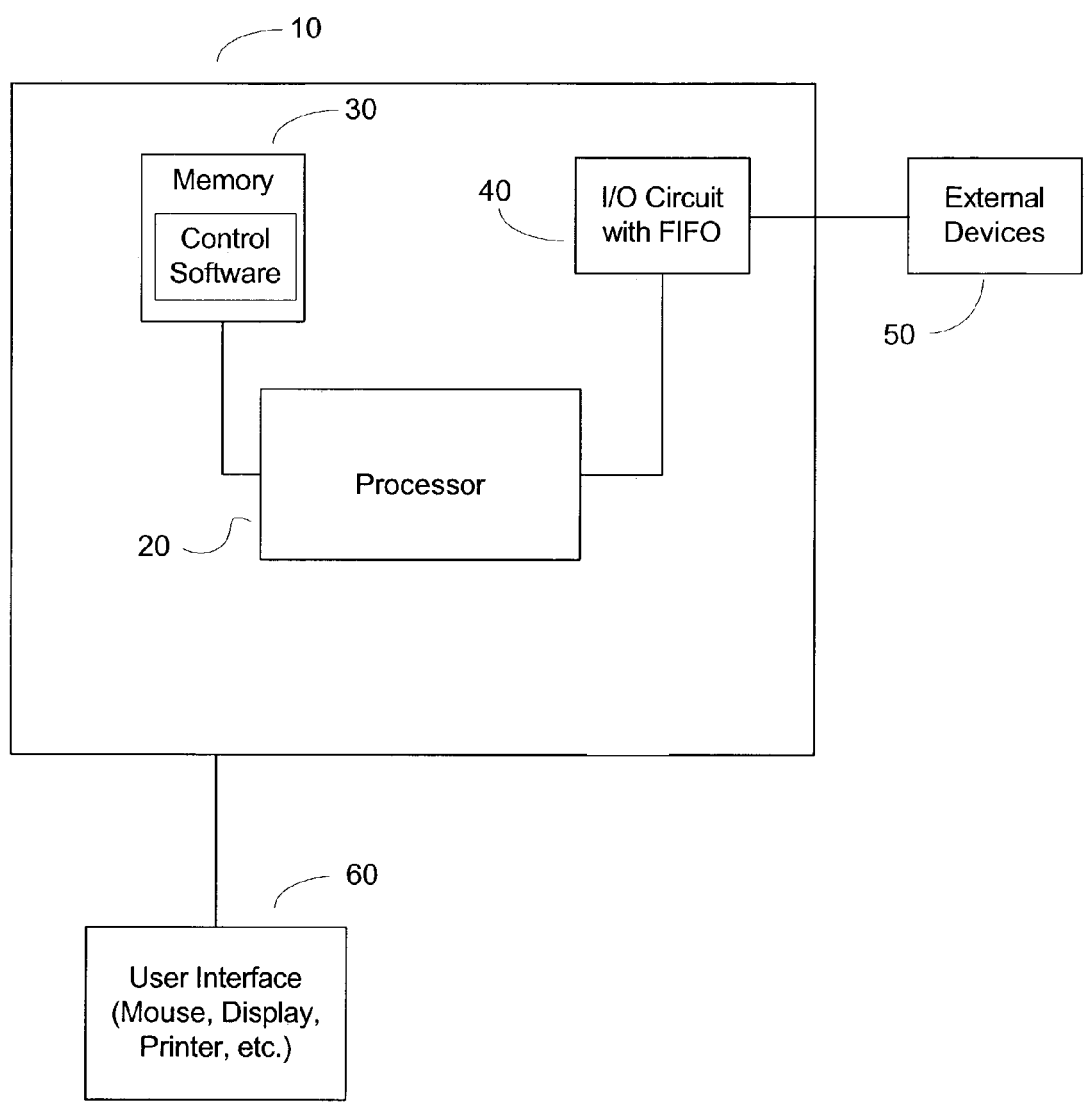
FIG. 1 is a diagram of a processor-based system incorporating an embodiment of the present invention.

A processor-based system 10 implementing an embodiment of the invention is shown in the block diagram of FIG. 1. The system 10 may be a server, a workstation, a personal computer, or any other system in which data transactions such as reads and writes take place in some transmission or I/O (input-output) subsystem.

The system 10 includes a microprocessor module 20, which includes at least one microprocessor operating in a conventional fashion and communicating with memory 30 and I/O (input-output) circuitry and/or logic 40. The memory 30 may in part store control software configured to execute operations according to the invention.

The I/O circuitry may include network circuitry and connections. In an embodiment of the invention, the I/O circuitry 40 also includes a FIFO (first-in, first-out) queue, which may be a circular FIFO, i.e. a FIFO in which old data is maintained in the queue until overwritten by new data as the read and write pointers "lap" the data entry locations by going through an entire set of entry locations before starting to overwrite old data.

External devices 50 will typically be connected to the system 10, and may include storage devices, other workstations or servers, or any of a number of devices that can communicate over a network to the system 10 and exchange data with it. The connection to the external devices may be by any conventional network, fibre channel, wireless or other communication mechanism.

A user interface 60 coupled to the system 10 includes a mouse, display, printer, track ball, and/or other devices allowing a user to interact with the system 10.

Figure 2:
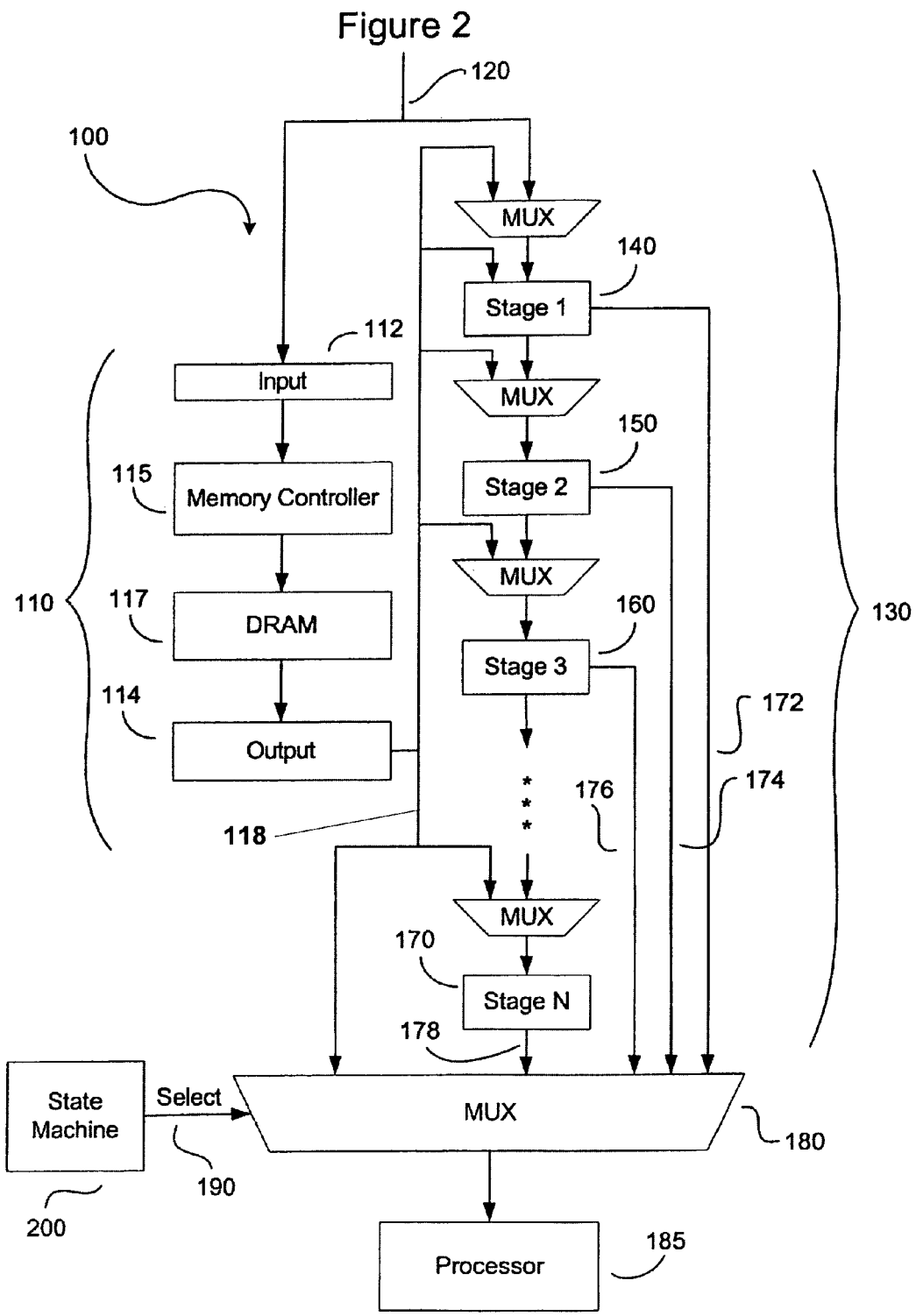
FIGS. 2–3 are block diagrams of alternative embodiments of a subsystem in accordance with the present invention.

FIG. 2 is a block diagram of a subsystem 100 that may be used to implement an embodiment of the invention. In this diagram, a FIFO with multiple potential cycles of latency is shown and discussed, with a generalized bypass having N stages. The discussion of FIGS. 3–6, below, addresses a specific SRAM-based FIFO with alternative embodiments of a two-stage bypass.

In FIG. 2, a FIFO 110 is provided with an input 112 and output 114. Between the input and output, the data may be sent to other circuitry, e.g. a memory controller 115, DRAM (dynamic random-access memory) 117, ECC circuitry (not separately shown), and/or other components desired to implement the FIFO. Since DRAM may operate at relatively slow frequencies, and these components may not all be formed on the same chip, implementation details of the FIFO 110 may lead to multiple cycles of latency for data access.

The FIFO 110 receives read and write requests and data from an input bus 120, which may be, e.g., from external devices 70, or from internal devices such as a processor. The subsystem 100 may be used in any data circuit, sending data and requests to and/or from a given device, such as a microprocessor or storage device. A typical setting could be in connection with a data bus in communication with a processor that requests data writes and reads to and from storage devices.

Since the queue 110 is a FIFO queue, there will be a latency for access to data that is written into the queue, which depends upon the configuration of the queue and upon the number of entries in the queue. Thus, using a bypass circuit 130 which receives the same data inputs as the queue 110 allows faster access by providing multiple stages 140–170, which may be implemented as flip-flops, whose outputs 172–178 are connected to a MUX (multiplexer) 180. An output bus 118 of the FIFO 110 is also coupled as an input to the MUX 180, and an output bus 185 of the MUX 180 is coupled to the processor 20 (or other suitable device).

The stages 140–170 are cascaded, so that they effectively store a history of the data passing through them, such as by, on each clock cycle for the subsystem 100, sending the data in a given stage to a succeeding stage, starting with stage 1 (when a data word first arrives), and proceeding to stages 2, 3, . . . , N. The number of stages N can be varied, and in typical settings will be no larger than the size of the queue (though it may be larger in some variations). In one embodiment, the number of stages N will be no larger than the number needed to compensate for the maximum possible access latency for the associated FIFO.

The bypass circuit 130 is thus a "ripple" bypass, with the cascading data entries passed from one stage to another with successive clock cycles, and with each stage having an output coupled as an input to the MUX 180. A select line 190 is used to select the output from the FIFO 110 or one of the stages 140–170 for use as input to (and thus outputting from) from the MUX 180. The bypass circuit 130 thus maintains at least a portion of the history of the inputs to the FIFO 110, with each entry in the stages 140–170 of this history being accessed substantially immediately, e.g. within one cycle time of the time a request is made, rather than waiting the entire latency time of the FIFO 110.

A state machine or circuit 200 can be used in a conventional manner to maintain a log of each data entry that has been stored in the bypass circuit 130, and when a given data entry is needed the state machine 200 determines from its log at which stage 140–170 the desired data entry may be found, and outputs a select value on the select line 190 that matches the output of the correct stage (i.e. the input at the MUX 180 from that stage).

The state machine may include a counter (not separately shown) that increments whenever a data item is added to the FIFO 110 and decrements whenever a data item is popped off, thus effectively keeping a count of the number of data entries in the FIFO. If the FIFO is full, then a request for the next available data entry (e.g. to be sent to the processor 185) can simply pull the data off the output stage 114 with no additional latency. If the FIFO is not full, then it is advantageous to pull the next data item off the bypass circuit 130, to avoid latency due to passing the required data through the FIFO, and thus the state machine 200 configures the select 190 to retrieve the data item from the bypass 130.

As data entries are entered into the FIFO 110, they are also latched into the stages 140, etc. of the bypass 130. For instance, a first data entry is written into input 112 and stage 140. When the second data entry is written into the input 112 and stage 140, the first data entry is pushed to stage 150 (as well as proceeding through the FIFO 110). When the third data entry is written into the input 112 and stage 140, the first entry is pushed to stage 160 and the second entry is pushed to stage 150.

If at this point the processor (or other component) requests the next available data entry from the queue, the correct data entry is in the third level of the FIFO 110 and in the third stage 160 of the bypass circuit 130. The state machine's counter indicates that there are only three entries in the FIFO, and accordingly configures the MUX select to access the next data item from the third stage (160) of the bypass 130, instead of waiting for that data item to be retrieved from the FIFO 110. In general, whatever the particular configuration of the FIFO and bypass, the state machine (using the counter) directs access for data to the bypass (by using the MUX) if the FIFO queue is not full, and to the FIFO queue if it is full.

If there is a latency of, for example, ten cycles for this FIFO, then it could take up to ten cycles after an access request for the processor 20 to receive the data entry. In this case, the state machine 200 provides a select value to the MUX 180 corresponding to output from stage (e.g. flip-flop) 160, which is input to the MUX on bus or line 176. This mechanism provides the requested value one clock cycle later, instead of, in this example, seven clock cycles later.

The system will access data items from the FIFO either when it is full or when a sufficient amount of time has passed (i.e. the number of latency cycles) such that the next data item is at the output register of the FIFO. Otherwise, the system will access the next requested data item from the bypass circuit.

Figure 3:
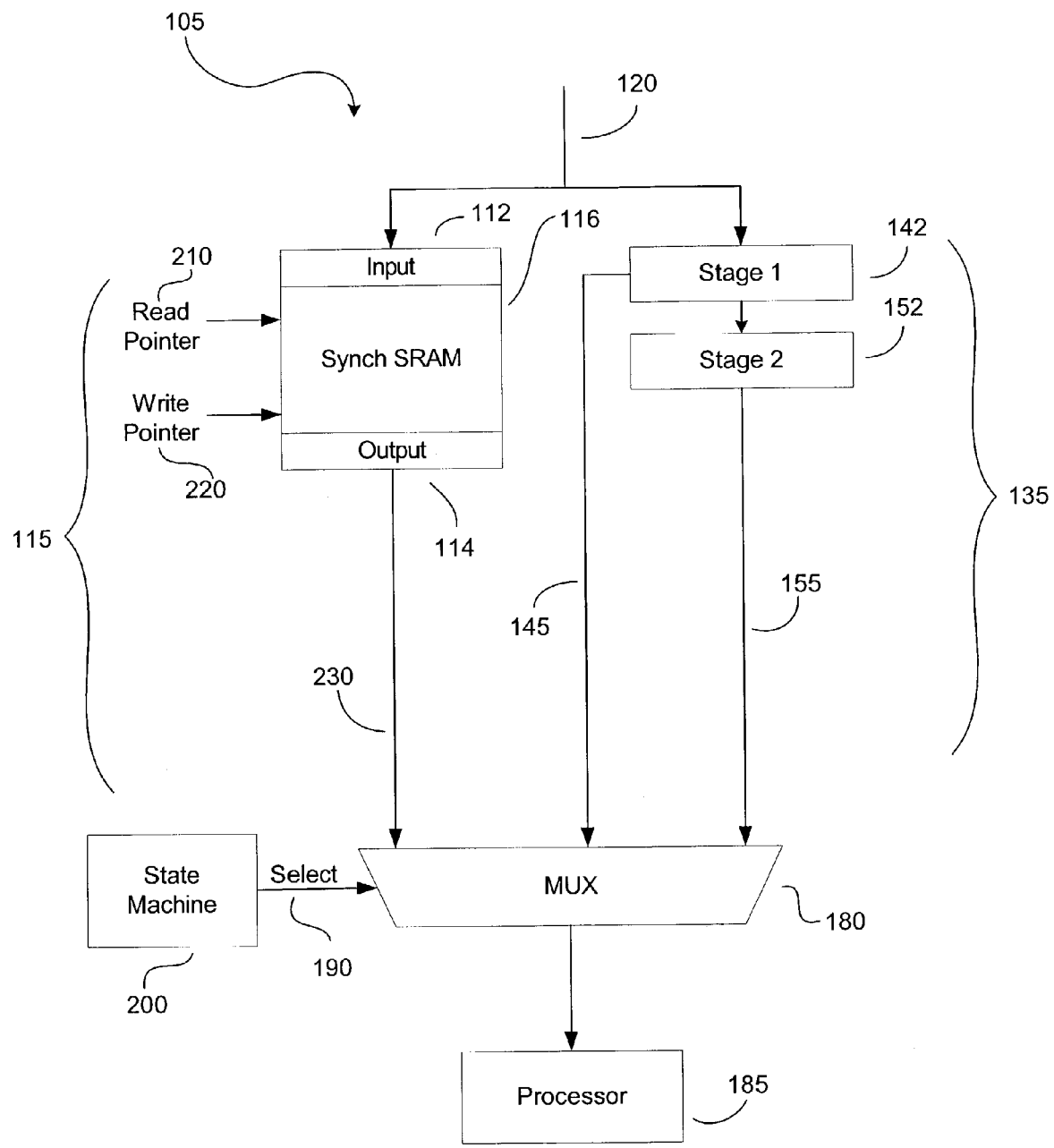

FIG. 3 shows an embodiment of a subsystem 105 with a FIFO 115 using SRAM 116 and a two-stage bypass 135. The subsystem 105 is in other respects similar to the subsystem 100, and similarly numbered components in FIGS. 2 and 3 may be identical. In this embodiment, the output 114 couples to the MUX 180 via an output 230, and stages 1–2 (142 and 152) couple to the MUX via outputs 145 and 155, respectively.

The SRAM in FIG. 3 is preferably synchronous SRAM or some other high-speed memory, though other types of storage technology are appropriate. SRAMs on a chip typically register (i.e. buffer) the data coming into and out of the subsystem 100 (unlike the older asynchronous SRAM designs). Even though SRAM is randomly accessible, for the purposes of the present setting it will be assumed that it is controlled by control logic (not separately shown) so as to be accessed in a FIFO manner for normal operation of the I/O queue 110, since it is in this setting that both the bypass circuit of the invention and the diagnostically useful history of data reads and writes are considered. However, in debugging or diagnostic mode, it is faster to use the SRAM in a random-access manner; thus both a FIFO mode and a random-access mode are used, for different purposes, in embodiments of the present invention.

A read pointer 210 and a write pointer 220 are associated with the SRAM 116. In a typical application, the write pointer 220 moves ahead of the read pointer, i.e. points to data entries in the SRAM that are "ahead of" (e.g. higher than—or lower than, if the write pointer has wrapped around) data entries to which the read pointer 210 points. As something is written from the queue 110, the write pointer is incremented, and the read pointer follows behind, being incremented as data entries are read off the queue.

Thus, when a new data item arrives, the write pointer will increment, e.g. from location 6 to location 7. If the system needs to access that data entry at that point (e.g. received a request for that item in that clock cycle), it could take many cycles of latency before the item is available at the other end of the FIFO queue 110. Although prefetches or read-ahead access can be used, in this example it is straightforward simply to access the desired data entry from the appropriate stage 1 of the bypass circuit 130. The deeper the FIFO 110, the more useful the bypass circuit will be in bypassing the FIFO's latency.

The timing diagram of FIG. 4 illustrates the manner in which the bypass 135 (or 130) reduces the latency of data access vis-a-vis the FIFO 115. In this diagram "Data 1" refers to data item 1 to be written to the FIFO and bypass circuit (and similarly for Data 2-Data 4).

In a first cycle (numbered "1"), data 1 is written to input 112 of the FIFO 115 and also to stage 1 of the bypass 135. In cycle 2, data 1 is written into the main SRAM array of the FIFO 115, and would be written into stage 152 of the bypass 135. However, in this example it will be assumed that the processor 185 requests data 1 during cycle 2. The state machine's counter indicates that there is (at the beginning of stage 2) only one item in the FIFO 115, and therefore causes the select line to bypass the FIFO and instead access stage 1 (142) of the bypass circuit 135.

Since the bypass stages 142, etc. act as both input and output registers, once a data item is written into a bypass stage, it is immediately available for output to the MUX 180. As a result, data 1 is available at the MUX in cycle 2, as shown in FIG. 4, and there is no need to write it into stage 2 (152) of the bypass.

Subsequent data items 2–4 are written into the FIFO 115 and bypass 135, as illustrated in FIG. 4.

The progress that data 1 would have followed if it had not been accessed via the bypass circuit 135 is shown by the parentheticals "(Data 1)" in cycles 3 and 4 of FIG. 4. Thus, data 1 would have been written into the output register 114 in cycle 3, and then been available at the MUX 180 for cycle 4. However, in this example, data 1 has already been read from the bypass, and data 2 becomes the foremost data item both in the FIFO and in the bypass, and is available at the output register 114 in cycle 4. Therefore, data 1 is not retrieved from the FIFO, but it is also not overwritten (at least not immediately), so that the history is preserved. Instead, the read pointer is incremented as if data 1 had been read from the FIFO, and the counter of the state machine is decremented to indicate that one fewer valid data item is present in the FIFO.

In cycle 3, data 3 is written into the FIFO and the bypass, and in cycle 4, data 4 is written as indicated, while data 2 is discarded from the bypass.

At cycle 4, data 2 is available for immediate reading from the FIFO 115, and it is not needed in the bypass 135, and thus discarding data 2 from the bypass in cycle 4 does not result in any increased latency for access to that data item.

Note that the subsystem 105 of FIG. 3 bypasses, in this particular configuration, at most two cycles of latency when the FIFO queue is empty and there is an immediate request for an incoming data item. These two cycles could be significant in a system where this situation is often repeated. In other configurations, with an empty or partially empty FIFO queue, more cycles of latency may be bypassed.

Figure 5:
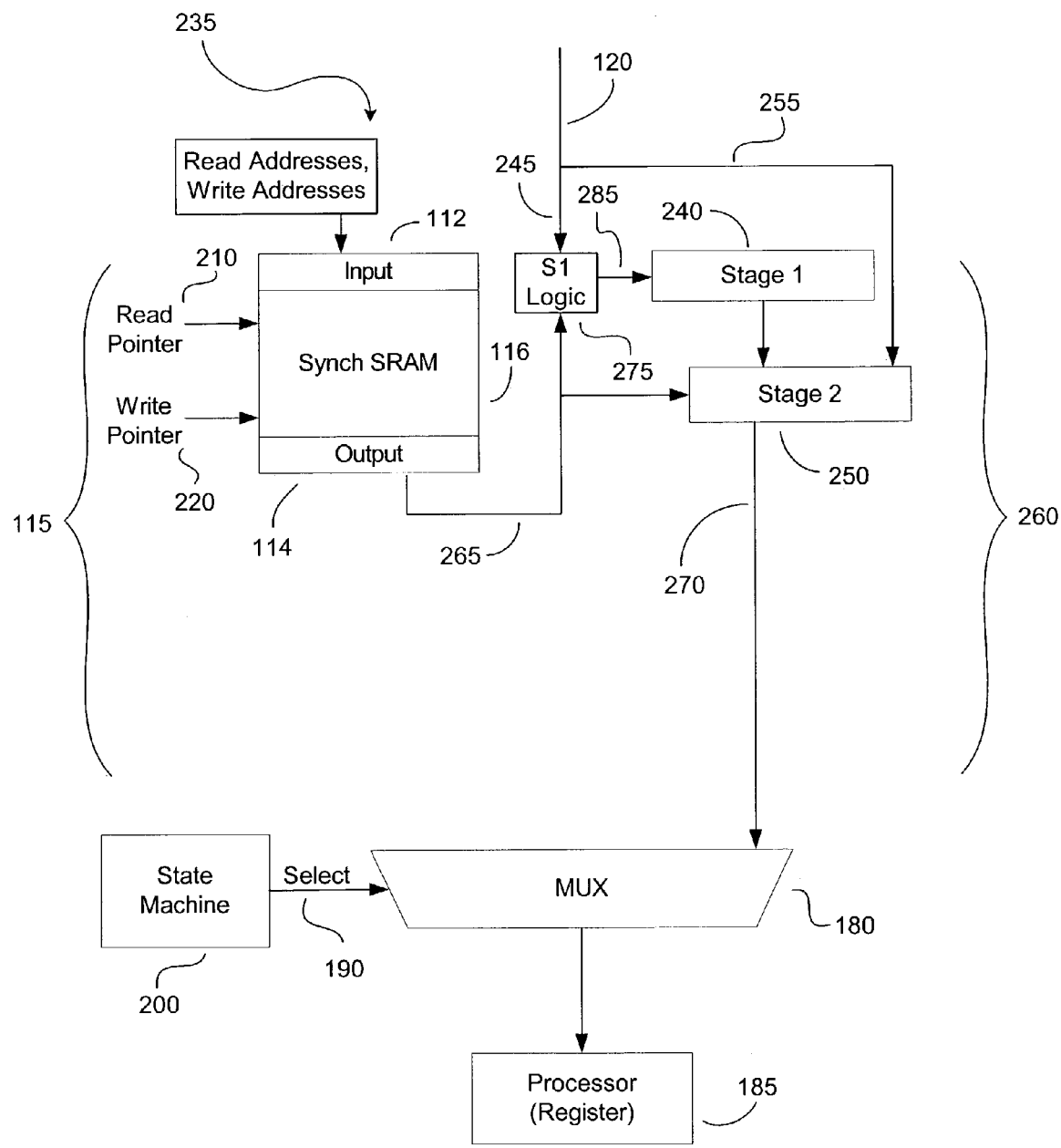
FIG. 5 is a block diagram of another embodiment of a subsystem in accordance with the present invention.

FIG. 5 is a diagram of an alternative embodiment of a subsystem 235 according to the invention, similar to FIG. 4 but with each of stages 240 and 250 having a data input (245 and 255, respectively) coupled to input line or bus 120. An output bus 265 from the output 114 of the FIFO 115 in this embodiment is provided as input to both stages 1 and 2 (240 and 250) of the bypass 260, with operation as described below. The buses 245 and 265 in one embodiment are connected as inputs to stage 1 logic 275, which provides outputs over bus 285 to stage 1 (240), in a manner to be described below.

Thus, in the implementation of FIG. 5, all reads provided to the MUX 180 pass through stage 2 of the bypass. A timing diagram of the operation of subsystem of FIG. 5 is shown in FIG. 6.

The subsystem of FIG. 5 and its operation represent just one of many bypass configurations available for use in the present invention. An alternative embodiment would be to create a bypass in the SRAM itself, but providing a bypass stage as shown can be simpler to implement, and allows the use of conventional SRAM. In either case, the bypass may be used with any number of degrees of latency, with different numbers of stages, inputs provided to the different stages and logic controlling those inputs as desired. A common feature to all these variations is that the FIFO array is provided with a bypass circuit to minimize or eliminate latencies as read data progresses to the output register of the FIFO and becomes available to the processor or other recipient.

In cycle 1 of the embodiment of FIG. 5, a first data word (data 1) that is registered at input 112 will be written at substantially the same time to stage 2 (250) of bypass 260, so that it is at the front of the bypass queue and immediately available over bypass output 270 to the MUX 180. Read addresses and write addresses are provided to the FIFO 115 as indicated in FIG. 5.

At this point, data 1 does not need to be provided to stage 1 of the bypass, because it is provided to stage 2; accordingly, the stage 1 logic 275 is configured to prevent data 1 from being written into stage 1. The values in the SRAM array 116, the output 114, the read pointer (ReadPtr), stage 1 of the bypass and the MUX 180 are undefined at this cycle, represented in FIG. 6 by an X.

In cycle 2, data 1 moves into SRAM 116, and a new data word (data 2) moves into the input 112. At the same time, data 1 is provided to the MUX 180, since in the previous cycle it was ready at the output stage 250 of the bypass 260, and data 2 is input to stage 1 of the bypass via buses 265 and 285, under control of stage 1 logic 275.

In cycle 3, data 3 is provided to input 112, and data 2 moves into SRAM 116. Referring to FIG. 6, it can be seen that a read command was issued in cycle 2 (indicated by "Pop"). In this embodiment, a read process takes two cycles: one to latch the address into the input register, and one cycle to latch the data into the output register. Thus, in cycle 3, due to the read in cycle 2, data 1 moves to output 114. The "pop" thus moves data at the head of the bypass (stage 2) to the MUX 180.

The read pointer is incremented when there are items being written to the SRAM for which it is legal to issue a read, but for which there is not yet an outstanding read. Thus, in cycle 3, the read pointer now indicates data 2.

At the same time, the write pointer is incremented to data 3, and as mentioned above is in one embodiment incremented upon each cycle in which a data word is input to the FIFO, in order to maintain the FIFO history.

In cycle 2, as data 1 is provided to the MUX from stage 2 of the bypass, data 2 is being written into stage 2, so that it will be available on the next cycle. Thus, in cycle 3, data 2 is available from stage 2 of the bypass. Data 1 is being read during this cycle, and can be discarded as indicated.

Also in cycle 3, the write pointer is incremented and data 3 is moved into the input register 112. The write pointer is incremented at each cycle, as shown in FIG. 6.

In cycle 4, data 4 is moved into the input register, while data 3 is moved into the SRAM array 116 and data 2 is moved to the output register. Data 2 also appears at the MUX, but is not popped or discarded, since there has been no read command for it.

In cycle 5, data 5 moves into the input register, data 4 moves into the SRAM array, and data 3 moves into the output register. The bypass 260 has not changed, and data 2 is still available at the MUX.

In cycle 6, data 6 moves into the input register, data 5 moves into the SRAM array, and data 4 moves into the output register. With the bypass maintaining the values of data 2 and data 3 as shown, the read pointer remains at 4, which is the next valid data (i.e. data 4) in the FIFO 115. Data 2 and data 3 are no longer maintained in the FIFO, but they are available from the bypass.

Also in cycle 6, a read command issues for data 2, and thus in cycle 7 data 2 is moved from the MUX into the processor (or, equivalently, any desired register) 185, and may be discarded. The read pointer can now be incremented to data 5 while data 4 is moved into stage 1 of the bypass and data 7 is moved into the input 112. Data 4 continues to appear in the output stage 114 during cycle 7, but will be removed on the succeeding cycle.

Note that the SRAM Array row in FIG. 6 indicates data 6 during cycle 7. This indicates that data 6 is moved into the SRAM array during cycle 7. Data 5 continues to be stored in the SRAM array (though this is not explicitly shown in cycle 7), as in general an number of intervening data words (between input 112 and output 114) may be stored, limited only by the size of the SRAM array.

Cycle 7 also shows a read command (pop) for data 3, and cycles 8–9 show read commands for data 4 and data 5, respectively. With the read commands coming in rapid succession like this, the data words are in one embodiment of the invention moved from the output 114 directly to stage 2 of the bypass, without passing them through stage.

Note that data 5 arrives at the output register 114 in cycle 8, during which a read command is issued for data 4. As a result, in cycle 9 data 4 should be ready for the MUX as shown, and data 5 may be moved directly to stage 2 in case a read command issues for data 5 during that cycle—which in fact is the case in this example. Thus, to move the data through without adding any latency in the bypass circuit 260, a portion (namely stage 1) of the bypass is itself skipped, by operation of stage 1 logic 275. That is, there is no need to write the data into stage 1 since it is already being provided directly to stage 2 and then to the MUX.

This rapid-read sequence proceeds until cycle 10 (a read for data 5 having shown up in cycle 9), where there is no read command, and thus in cycle 11 the bypass maintains the value of data 6 in stage 2, while data 7 is moved into stage 1, and the read pointer is maintained at data 8, which is the lowest-numbered valid data in the FIFO at this point.

Succeeding operations are similar to the above. The use of the bypass thus allows immediate access to data being provided to the FIFO, due to bus 255 communicating directly (i.e. without going through the FIFO) to stage 2, which eliminates FIFO latencies in case the read commands have gotten ahead of the cycles needed to pass the requested data through the FIFO to its output. When the FIFO has had a chance to load data through the SRAM and into the output register, then successive reads may effectively be taken straight from the FIFO without the use of the earlier stage(s) (e.g. stage 1) of the bypass circuit.

Because the write pointer is incremented on each cycle regardless of whether a read command has issued for that cycle, the FIFO can act as a history FIFO while avoiding latencies, as described. When the FIFO has been filled and the words "wrap" around to the original physical address, then new data can overwrite the old (already read) data words. The history of the FIFO can be made arbitrarily large, limited only by the selected size of the SRAM array.

Given the above embodiments, it is straightforward to provide the logic (circuitry, firmware and/or software as desired for the implementation) to carry out these operations.

The bypass 260 of FIG. 5 operates in a fashion similar to the bypass 135 of FIG. 3, differing in that there are multiple inputs (one for each stage) and a single bypass output 270 to the MUX 180 in the embodiment of FIG. 5, whereas in the embodiment of FIG. 3 there is a single input 120 to the bypass, but multiple outputs (one for each stage) to the MUX. The configuration of FIG. 3 may be used when the write operation into the bypass is executed by slower components or architecture than the data transfer operation between the bypass stages and the MUX 180, in which case it may be preferable to execute the slower write operation into the bypass only once per data item, and have the faster logic handle the interstage transfers and output to MUX. On the other hand, if the interstage and bypass output logic is slower, it may be preferred to use the embodiment of FIG. 5, wince the write operation to the stages 240 can be carried out relatively quickly.

FIG. 7 shows an example of a eight-stage (0 through 7) FIFO 300, which is one possible implementation of the FIFO 110. In this example, the write pointer 310 will cause the next write data to be written at entry 5, and the read pointer 320 will cause the next data read to access entry 3. Since this is a circular FIFO, there will be typically be older entries at levels 5 (which is about to be written to), 6–7 and 0–2.

One function provided by the present invention is to maintain history of data inputs in the FIFO 110 even as the data entries are read off, by incrementing the write and read pointers 310–320 even when a written data item has been read or "popped" off the queue 300 (or 110).

FIG. 8 shows an example where the read and write pointers are pointing to the same data entry, at level 4, where a data word "X" (e.g.) has been written. The fact that the read and write pointers are pointing to the same location is an indication either: (1) that the queue 300 is empty (contains no valid data), i.e. every data item that has been written to the queue 300 has been read off, and the read pointer has "caught up" with the write pointer; or (2) that the queue 300 is full, and the write pointer has wrapped around to catch up to the read pointer.

In prior systems, on the next write-data command, the data word to be written would be stored again at location 4, and the value "X" would be lost as an item of history of the data transactions. To avoid this happening, in the current system when a new data item is to be written to the queue 300 (or 110), the write pointer 320 is incremented even if the queue is, by conventional definition, "empty". This is because, the past data that has already been written and read is useful for debugging diagnostics, and therefore, even though the data item "X" is no longer useful from a normal operation point of view (e.g. the requesting application or device has already received the data "X"), if there is a system error or recovery attempt, the history of that value "X" at location 4 could prove important.

Likewise, to read the new item at location 5, the read pointer 310 is incremented in FIG. 8 to read the data item from location 5. Incrementing the read and write pointers even when the queue is considered to be empty preserves the history of the data at successive locations in the queue.

FIG. 9 shows an example where the queue 300 is not empty, i.e. the write pointer 310 and read pointer 320 are pointing to different locations in the queue, because not every data item that has been written has yet been read. Thus, data value "Y" is to be written to level 5, while data value "X" is read from level 4. This would happen if data "X" was written to, but not immediately read from, level 4. If the data item "X" was written to level 4 on, e.g., cycle 1, then on that cycle the value "X" appears in stage 1 of the ripple bypass circuit 130. At cycle 2, that value "X" will be written to the next stage (stage 2) of the bypass 130, and the value "Y" will be written to stage 1.

The contents of the bypass circuit flip-flops for two successive cycles is illustrated in FIG. 11. In this example, in which a bypass circuit having five stages is illustrated, at cycle 1 there are five data entries, with stage 1 having a copy of the item that appears in level 4 of the FIFO, and so on down to stage 5 of the bypass circuit, where a copy of the data item in FIFO level 0 is stored.

At cycle 2 in FIG. 11, the next data item has been written into the FIFO, and since the bypass circuit has only five stages, the data corresponding to FIFO level 0 is discarded, and the bypass stages 1–5 now include the data from FIFO levels 5–1, respectively. Thus, the data that had been stored at FIFO level 0 would be lost for later diagnostic purposes, if it were not maintained as described in the FIFO.

The separation between write pointer 310 and read pointer 320 is a measure of how many items have been written to but not read from the queue 300. In FIG. 7, there are at least two valid data entries (at levels 3 and 4), which have been written but not read. It is possible for the write pointer to wrap all the way around the queue until it comes up "behind" the read pointer, in which case the queue would be full and a potential latency of a number of cycles equal to (or otherwise corresponding to) the number of levels in the queue could result.

As a specific example, in FIG. 10 the write pointer points to level 6 and the read pointer points to level 0, so there is a potential latency of six cycles if the most recently written item (i.e. the item written at level 5) is requested. In this case, the bypass circuit could, by providing that item on the next cycle via the MUX 180, effectively eliminate or bypass five cycles of latency.

In practical settings, the bypass circuit will usually be much smaller than the FIFO queue, both for economy of design and to minimize power usage, so if the bypass circuit in the example of FIG. 10 has, e.g., only four stages, then there will still be some latency when the data item at level 5 is requested, since that item will not yet have been written into the bypass circuit flip-flops. In this setting, read-aheads are useful, and the bypass circuit still reduces the number of cycles of latency.

If the bypass circuit is accessed (by the state machine 200 selecting one of its stages via the select line 190) for a data item which has been written to the FIFO (10 or 300), it is accordingly useful for diagnostic history to still increment the write pointer. In one embodiment it is useful to increment the write pointer every time a new data entry arrives at the queue 110 or 300, regardless of whether that item is then retrieved from the bypass circuit.

In this manner, a rich history of data writes is maintained. In another embodiment, the FIFO queue is not used until the bypass circuit's stages are full, which can effectively increase the total amount of history by adding the number of stages of the bypass circuit to the number of levels of the FIFO queue. These embodiments of the invention are automatically scalable to any number of levels of the FIFO queue or stages of the bypass circuit.

In another embodiment of the invention, a pointer or flag is used as a history flag, and has one value (e.g. 0) at the beginning of data transactions, before every entry of the FIFO queue has been written to. Once the queue has "wrapped", i.e. every entry has been written to at least once since some predetermined time (e.g. since boot-up or since starting up of a given application), the history flag can be set to another value (e.g. 1), indicating that every entry in the FIFO is "valid" from a diagnostic history perspective (though not necessarily valid in a conventional sense for purposes of a control application or operating system).

Thus, as data items are first written into the FIFO queue 110, most of the existing values will be meaningless both for a control application or OS and for diagnostic purposes. If there is an operational fault before the FIFO has had every entry written to, then the 0 value of the history flag will indicate this, and a debugger would be configured to access only those values that have been written to. After the write pointer has wrapped around, the history flag is set to 1, and any debugging access to the historical data can be made to all levels of the FIFO.

The read and write pointers and generally the operation of the FIFO queue and bypass circuit are controlled in a conventional fashion by control logic—i.e. software, hardware and/or firmware, as desired for a particular implementation. Each of the operations described above, e.g. of incrementing the read and write pointers or accessing the bypass circuit stages, is thus carried out under the control of such logic, which may for instance take the form of an OS or application with software or program modules configured to execute the needed operations. Control software is typically stored in the memory 30 for use by the processor 20, in a conventional fashion.

The mechanism of incrementing the write pointer at each data event in the FIFO queue, and the read pointer as needed, would be counter indicated in a conventional system, since once a data item is read off there is no need to maintain that item, and incrementing the pointers apparently needlessly involves extra steps that must be implemented. However, as seen from the above discussion this mechanism allows a FIFO with a bypass to become a history FIFO, providing a diagnostic tool that was heretofore unavailable in such a setting.

Maintaining a history flag to indicate that the write pointer has wrapped around the FIFO queue adds utility by providing information to a diagnostic routine or a system administrator that relating to the number of historically useful data items in the FIFO queue.

Given these features, other applications of the invention are possible. In general, in a setting where memory accesses are made sequentially to a device, subsystem, database or the like, and where an indicator (e.g. a write pointer) is used to point to the currently accessed data location, the mechanism of incrementing the indicator to the next data location upon each data access (e.g. write) event allows a history of the events to be maintained for diagnostic purposes. Although the invention has been described in the setting of a FIFO queue with a bypass circuit in an I/O subsystem, the concepts may be applied in other settings.

What is claimed is:

1. An I/O subsystem in a processor-based system, including:
   a data queue;
   control logic configured to store data items in the data queue in order of arrival and retrieve data items from the data queue by the use of a write pointer and a read pointer, the write pointer and read pointer being configured to indicate locations to which data items are to be written and read, respectively;
   the control logic including a module configured to increment the write pointer upon each of a set of data events relative to the data queue;
   a bypass circuit in communication with the data queue and including a plurality of stages, each stage being configured to store a data item; and
   bypass circuit logic configured to access data items that are stored in the data queue from the stages of the bypass circuit, wherein an order in which data items progress through the data queue is maintained irrespective of an order in which said bypass circuit logic accesses said data items.

2. The subsystem of claim 1, wherein the set of data events includes all write events relative to the data queue.

3. The subsystem of claim 1, wherein the set of data events includes all read events relative to the data queue.

4. The subsystem of claim 1, wherein the control logic is configured to fill a bypass circuit stages before writing to the data queue.

5. The subsystem of claim 1, wherein: the data queue is a circular FIFO; and the control logic is configured to maintain a history flag indicating whether the write pointer has wrapped around the data entries in the circular FIFO.

6. A method of maintaining a data queue, including the steps of:
   maintaining a write pointer indicating write locations in the data queue at which data items are to be written;
   maintaining a read pointer indicating read locations in the data queue from which data items are to be read;
   upon each write event to the data queue, incrementing the write pointer, to maintain a history of data events in the data queue in order of arrival; and
   maintaining a multistage bypass mechanism configured to provide access to items that have been written to the data queue in advance of a latency time of the data queue, wherein an order in which items progress through the data queue is maintained irrespective of an order in which said bypass mechanism accesses said items.

7. The method of claim 6, wherein the data queue comprises a circular FIFO queue, and further including the steps of: maintaining the write pointer at least in part by wrapping write locations around to a beginning of the data queue when an end of the data queue is reached; and maintaining a history flag to indicate when the write pointer has wrapped around.

8. The method of claim 7, further including the step of: performing a diagnostic routine on the data queue, the performing step including in part the step of determining from the history flag whether all data locations in the data queue have been written to.

9. An I/O system including a circular FIFO queue and a bypass circuit, the I/O system configured to operate under control of control logic, the control logic including:
   a write pointer module configured to maintain a write pointer to indicate write locations to which data is to be written in the queue in order of arrival;
   a read pointer module configured to maintain a read pointer to indicate read locations to which data is to be read from the queue; and
   a data access module configured to retrieve data that has been written to the queue from the bypass circuit in an order different from that in which the data was written to the queue, wherein an order in which data progresses through the queue is maintained irrespective of an order in which said data access module retrieves said data;
   wherein the write pointer module is configured to increment the write pointer upon each write data event to the queue.

10. The I/O system of claim 9, wherein the control logic further includes a history flag module configured to indicate whether the queue has been fully written with data at least once since a predetermined time.

11. The I/O system of claim 9, further including diagnostic logic configured to access data items that have been written to and read from the queue.

12. The I/O system of claim 11, wherein the FIFO queue includes an SRAM module, and the control logic is configured to access the SRAM module in a FIFO manner for data read and write operations, and is further configured to access the SRAM module in a random-access manner for diagnostic operations.

* * * * *